US006607137B2

(12) United States Patent
Morales

(10) Patent No.: US 6,607,137 B2
(45) Date of Patent: Aug. 19, 2003

(54) METHOD AND APPARATUS FOR CASTING A VOTE FROM HOME ON ELECTIONS

(76) Inventor: Fernando Morales, 2231 Wakerobin La., Reston, VA (US) 20191

(*) Notice: Subject to any disclaimer, the term of this patent is extended or adjusted under 35 U.S.C. 154(b) by 0 days.

(21) Appl. No.: 09/815,002

(22) Filed: Mar. 23, 2001

(65) Prior Publication Data

US 2002/0134844 A1 Sep. 26, 2002

(51) Int. Cl.[7] .................................... G06K 19/06
(52) U.S. Cl. .................................... 235/492
(58) Field of Search .................................... 705/50, 12, 35; 235/492

(56) References Cited

U.S. PATENT DOCUMENTS 4,641,241 A * 2/1987 Boram .................... 235/50 R
5,583,329 A * 12/1996 Davis et al. ............... 235/386
5,875,432 A * 2/1999 Sehr .......................... 235/386
5,878,399 A * 3/1999 Peralto ...................... 235/386
6,081,793 A * 6/2000 Challener et al. .......... 235/386

* cited by examiner

*Primary Examiner*—Thien M. Le
*Assistant Examiner*—Lisa M. Caputo
(74) *Attorney, Agent, or Firm*—Roberts, Abokhair & Mardula LLC

(57) ABSTRACT

This invention provides a method and system for conducting elections using a personal voting code enabled electronic device (PVCe-ballot) as the voting ballot. Voters maintain their vote selections in secrecy even if third parties observe vote casting. One or more computers or personal computers perform the functions of a pre-election computer, voting computer and an elections computer. Voters provide or enter voter verification information. If voter verification matches that stored in the PVCe-ballot, the voter is allowed to enter voting codes. Election selections are marked as affirmative when an entered voting code matches a stored personal voting code. Optional security features include the use of party access codes and tamper detection circuitry.

20 Claims, 9 Drawing Sheets

METHOD AND APPARATUS FOR CASTING A VOTE FROM HOME ON ELECTIONS

BACKGROUND OF THE INVENTION

The present invention relates to electronic devices for elections. More specifically, this invention relates to an apparatus and method of controlling the local, State or National election process by the use of a personal electronic device as the voting ballot that can be forwarded to a voter's home using regular mail.

The United States Presidential Election of 2000 made it clear that a new solution is desirable. The personnel, time and costs involved in the counting and manual recounting of votes are an issue to be resolved. Further, present voting systems do not maintain ballot secrecy when the vote is cast from home, office or public places (for example absentee balloting). Thus, it is desirable to have a method of elections that allows casting a vote from home, office, public places or precinct without losing either the secrecy or the security of the ballot. It is further desirable to provide a means for counting votes in less time and at lower cost than existing methods.

Since International Business Machines introduced the personal computer (PC) in 1981, its presence and availability among citizens has become widespread. In fact, Plunkett Research estimates that approximately 60% of U.S. homes contain a PC, and many homes contain more than one. In addition 42% of U.S. office workers have access to the Internet at work, and 63% of the U.S. workforce now use a computer on the job daily. For those homes not equipped with a PC, local libraries, schools and voting sites provide public access to PCs.

The wide availability of personal computers now permits the cost effective solution of the present invention to be practicable. As described below, the present invention takes advantage of the PC to provide human interface functions without the need for proprietary voting entry hardware.

Previously proposed voting systems have not enjoyed the cost advantage of utilizing existing personal computers already conveniently sited for the majority of the U.S. population. For example U.S. Pat. No. 5,666,765 to Sarner et al. discloses a proprietary computer based voting booth. U.S. Pat. No. 5,878,399 to Peralto discloses a computerized network of voting modules for voting precinct use. U.S. Pat. No. 5,610,383 to Chumbley discloses a proprietary ballot card reader. U.S. Pat. No. 5,278,753 to Graft discloses a precinct based voting system that stores voter selections onto optical media, which in turn is read at a central polling office. U.S. Pat. No. 5,583,329 to Davis et al. discloses a precinct based voting system that stores voter selections onto voting terminal memory, which in turn is transferred to supervisory memory apparatus. The supervisory memory apparatus is then transported to electoral headquarters for retrieval of precinct vote tallies.

Other proposed voting systems are not associated with physical electronic ballots that can be easily mailed to voters. For example, U.S. Pat. No. 6,092,051 to Kilian, et. al. discloses a secure receipt-free electronic voting that relies upon an electronic bulletin board. Similarly, U.S. Pat. No. 6,081,793 to Challener et. al discloses electronically transmitted voting with alternate non-electronic paper ballots.

BRIEF SUMMARY OF THE INVENTION

It is an object of the present invention to allow casting a vote from home, office, public places and/or precinct without losing the secrecy of the vote.

It is an object of the present invention to show a method of controlling the local, State or National election process by the use of an electronic device or electronic ballot.

It is an object of the present invention to remove the vote of an invalid voter without compromising the secrecy of the election, in a manner that facilitates the challenge of ineligible votes and the correction of erroneous votes.

It is an object of the present invention to simplify the complexity of the election system hardware using personal computers and electronic ballot.

In one embodiment of the present invention an apparatus is described that allows casting of votes from home while maintaining voting confidentiality when voting is observed by third parties. The apparatus includes one or more computers, a plurality of personal voting code enabled electronic ballots (PVCe-ballot) and one or more computer connectivity interfaces. A verified voter enters voting codes. When a voting code matches a personal voting code that is present in the PVCe-ballot, an affirmative vote is registered.

In some embodiments of the present invention an electronic ballot is powered by using an electromagnetic field first pulse.

In yet another embodiment of the present invention a method of casting a vote in elections using a PVCe-ballot is disclosed. PVCe-ballots are prepared under the supervision of election officials, voter verification information that matches PVCe-ballot stored information is entered and affirmative voting selections are made by entering voting codes that match personal voting codes stored in the PVCe-ballot. The method may further provide a method to erase a ballot in the event tampering with the PVCe-ballot is detected.

DETAILED DESCRIPTION OF THE INVENTION

Figure 1:
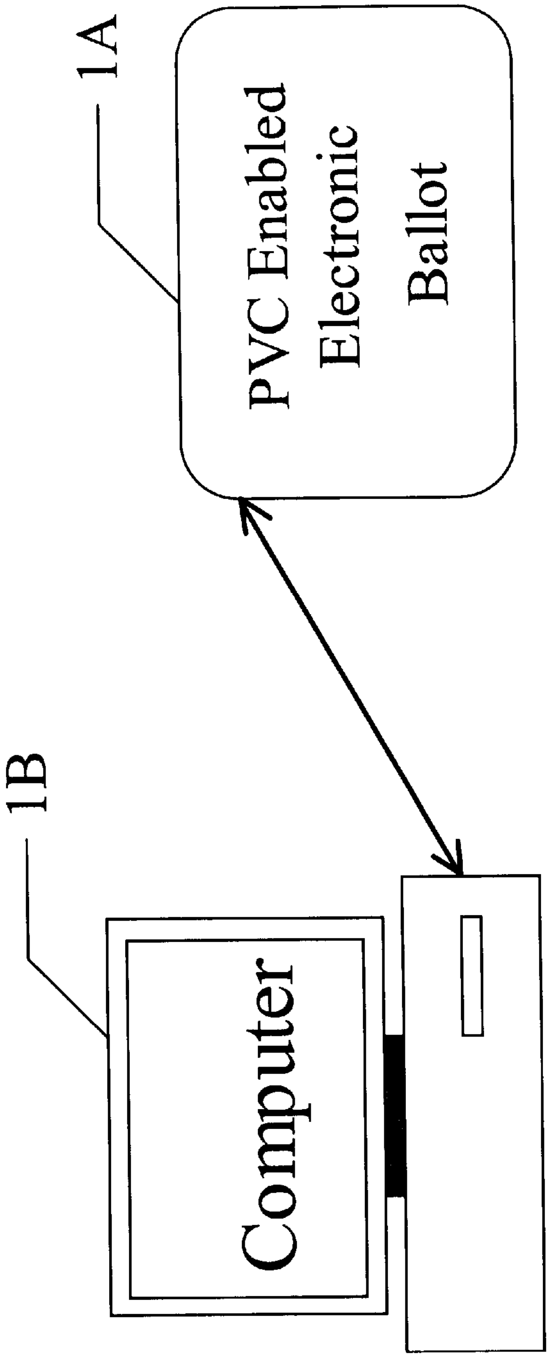
FIG. 1 illustrates an embodiment of the present invention comprising a personal computer and a personal voting code enabled electronic ballot.

According to the present invention, a method and system is provided for conducting elections using a personal voting code enabled electronic device as the voting ballot. The system also permits paper type ballots to be utilized at voting precincts if desired. Method steps may be performed by one or more computers or personal computers (PC) in order to conduct an election in accordance with this invention in a cost efficient manner.

In accordance with the invention, voters maintain their vote selections in secrecy even if third parties observe vote casting. Votes are cast using a voter interface connected to a computer. Virtually any computer is suitable for use and include computers such as personal computers, mini-computers, mainframe computers, personal digital assistants (PDA) etc. Preferable are personal computers (PC) due to their relatively low cost, standardized software operating system and wide availability to voters. Voters may also cast votes from home. As used herein "cast votes from home" means a voter entering their vote selections at a location remote from the official polling location, for example, at their home, local library, local school, or other location having a suitable computer and computer connectivity interface.

The system of the present invention comprises personal voting code enabled electronic devices (PVCe-ballot), computer and connectivity means. In preparation for casting a vote, a voter connects a PVCe-ballot to a voting computer. Upon successful connection, the computer displays a voter identification stored in the PVCe-ballot and requests voter verification. Various means are known in the art for voter verification and include use of personal identification numbers (PIN) and biometric information, for example fingerprint and retinal scanners or DNA scanner. Provided the entered voter verification matches that stored in the PVCe-ballot, the voter is, permitted to proceed to cast his or her vote selections.

Vote selections are cast by entering and saving a personal voting code (PVC) for the desired selection. Vote selections saved with codes other than a personal voting code are treated as non-votes. Personal voting codes are preferably known only to the voter. In this manner, a voter can enter a code for each voting selection without an observer becoming aware of which entries represent votes (PVC entry) and which entries represent non-votes.

In one exemplary embodiment of the invention, the computer assigns an initial number for each voting selection on a consecutive basis, starting with a fixed or random number. The voter increments or decrements initial numbers until each affirmative vote selection has an assigned number matching a personal voting code (PVC). In the event that more than one selection may be made for a particular voting selection, a different PVC must be assigned to each vote selection in order to maintain the secrecy of the PVCs. For example, if a particular elected office instructs voters to select two candidates, two different PVCs are used in voting for that elected office. Personal voting codes (PVCs) may consist of a single digit or character or may comprise multiple digits and characters, words or phrases.

When the voter completes entry of PVCs for affirmative vote selections, the votes are "cast" by transmitting to the PVCe-ballot the voter verification (e.g. PIN or biometric scan) along with PVCs (or non-PVC code) assigned to each voting selection. The PVCe-ballot stores an affirmative mark for each valid PVC received. Validity of PVC is determined by first requiring a valid voter verification and second by requiring a PVC valid for that voter. Preferable forms of voter information include personal identification number (PIN) and biometric scan data (e.g. fingerprint, retinal scans, etc). When biometric scan is used for verification, the scanner may optionally be incorporated into the PVCe-ballot.

In order to further prevent voter fraud, the use of party access codes may be incorporated into the method of the invention. In this embodiment, party access codes (PACs) are controlled by each political party. Prior to counting votes, a representative of each party must enter their respective PAC into a vote counting computer. Logic or circuitry in the PVCe-ballot prevents vote selection transmission unless the PACs stored in the PVCe-ballot are the same as those entered into the counting computer. Party access codes (PACs) are stored at the time the PVCe-ballot is prepared for use by a voter. The PVCe-ballot may also be configured to delete its memory of vote selections after receiving more than a designated number of invalid PACs. The counting computer accumulates and stores the vote selections. Voting results may be further protected by remaining hidden unless a valid PAC is reentered.

As used herein, "PVCe-ballot" refers to a personal voting code enabled electronic ballot capable of being initialized with voting selection choices, voter identification and verification information, two or more personal voting codes and optionally one or more party access codes. It is envisioned that initialization will occur in front of a judge or other election representative. The voter first must pass administrative procedures to be identified and verified as an eligible voter. The voter's verification information, personal voting codes and receiving address are entered into a secure database on a pre-election computer. Entry of personal voting codes is preferably performed in a method that restricts knowledge of the codes to the voter. Prior to the election, the pre-election computer transmits the voter identification (VI), voter verification information (e.g. PIN), personal voting codes (PVCs) and voting selections to any PVCe-ballot. The PVCe-ballot, in turn, stores the transmitted data into its resetable non-volatile memory. The initialized PVCe-ballots will typically be placed into a secured storage area for later distribution. For convenience, the PVCe-ballots may be organized by zip code +4 at the elections office.

In preparation for an election, election officials validate the listing of eligible voters stored on the pre-election computer. For two party elections, each party may be assigned a "party access code" (PAC). These codes may be required to be entered before a party official may validate eligible voters. Otherwise, election officials are charged with the task of accessing the pre-election computer and validating eligible voters. The pre-election computer is then used to mark appropriately validated eligible voters as validated The pre-election computer is next used to prepare the PVCe-ballots. PVCe-ballots are connected one by one, (manually or with an automatic feeder) to the. pre-election computer. The pre-election computer transmits a command to read the PVCe-ballot. In response, the PVCe-ballot transmits the voter identification previously stored in its non-volatile memory. Provided the voter identification (VI) matches that of a validated eligible voter, the pre-election computer transmits to the PVCe-ballot the information needed for the coming election (e.g. voting selections) along with party access codes if being utilized and a store command. For convenience, the pre-election computer may also print one or more labels with the voter name and address. The labels can be used by election officials for shipping labels (e.g. for hand delivery, mail delivery, etc.), as return address labels or as a means to identify the PVCe-ballot.

If the voter identification stored in the non-volatile memory of the PVCe-ballot does not match that of a validated eligible voter, the pre-election computer transmits a delete command to the PVCe-ballot, causing the PVCe-ballot to clear its non-volatile memory.

In one embodiment of the invention, a list of ineligible voters is also maintained on the pre-election computer. For protection of the voting process, this list of ineligible voters (LIV) may only be modified by election officials or others with restricted access passwords (e.g. party officials in a multiple-party election may be assigned party access codes to access the LIV). When the PVCe-ballot is connected to the pre-election computer and transmits the voter identification, if the voter identification matches one on the LIV, the pre-election computer transmits a delete command to the PVCe-ballot, causing the PVCe-ballot to clear its non-volatile memory.

DETAILED DESCRIPTION OF THE DRAWINGS

Referring to FIG. 1, a computer or personal computer (PC) 1B and a personal voting code enabled electronic ballot (PVCe-ballot) 1A are illustrated. The computer 1B refers to all computers utilized by the invention in performing the functions required for conducting an election in accordance with this invention.

The computer or personal computer 1B communicates with PVCe-ballot 1A by any suitable connectivity means (optical, radio frequency, electric current, electric voltage, magnetic field, etc.) Preferably the connectivity means is a magnetic field. For illustration purposes, the apparatus will be described using a magnetic field connectivity means, although this should not be considered limiting the scope of the invention. The PVCe-ballot preferred embodiment is a specific semiconductor design with a magnetic interface, but with some limitations can be accommodate on a smart card or on micro controllers available on the market and interface with the PC by means know.

Figure 2:
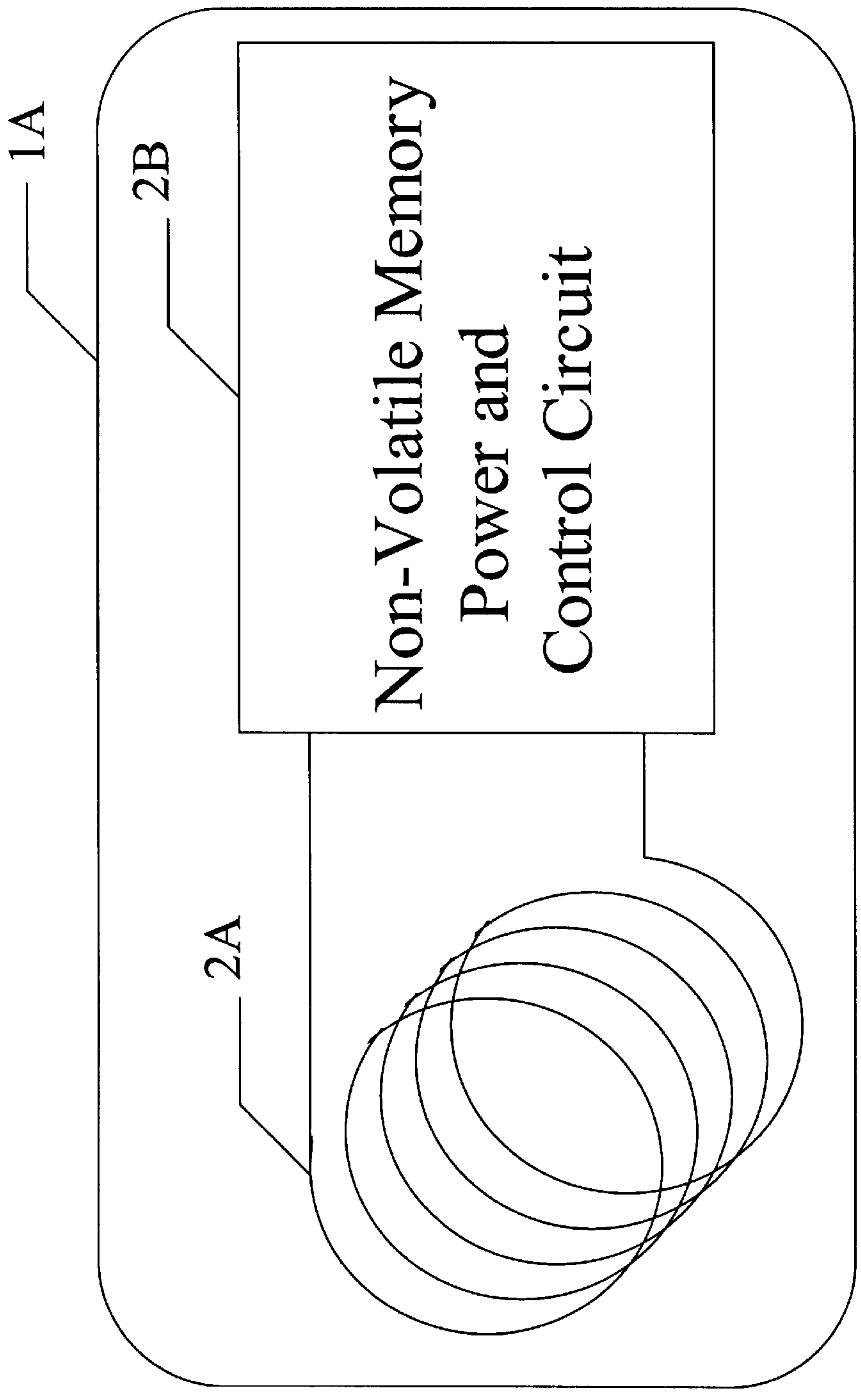
FIG. 2 illustrates a simplified block diagram of one embodiment of a personal voting code enabled electronic ballot apparatus.

Referring to FIG. 2 one embodiment of a personal voting code enabled electronic ballot 1A is illustrated and comprises a coil 2A that functions to receive and transmit signals between PVCe-ballot 1A and a computer or personal computer. Once a communications link is established, information can flow from and to the outside of PVCe-ballot 1A. Illustrated as block 2B are components comprising non-volatile memory, power supply and control circuits.

Figure 3:
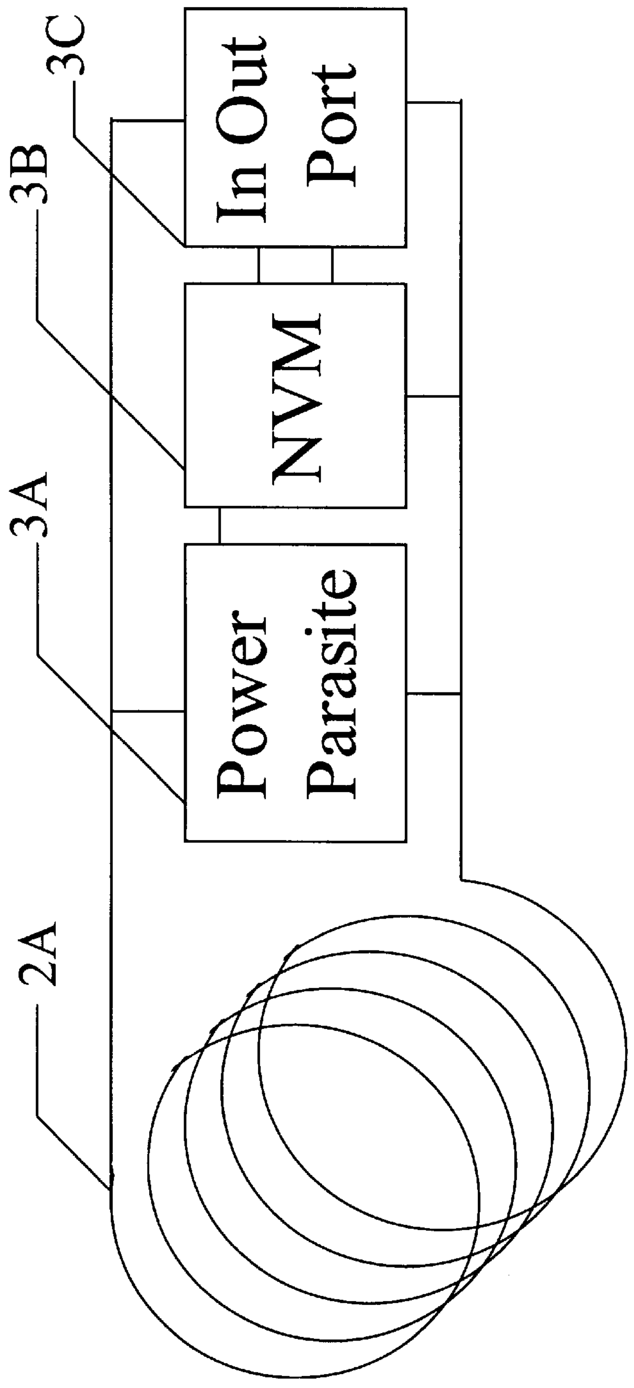
FIG. 3 illustrates a block diagram of one embodiment of a personal voting code enabled electronic ballot.

FIG. 3 illustrates PVCe-ballot internal components separated functionally. Coil 2A receives or transmits signals between the PVCe-ballot and a computer or personal computer. Power parasite circuit 3A captures energy from the fluctuating magnetic field associated with the electric pulses of the coil 2A. Captured energy is used to supply the voltage and current needed to operate non-volatile memory and control circuit 3B and input/output port 3C.

Figure 4:
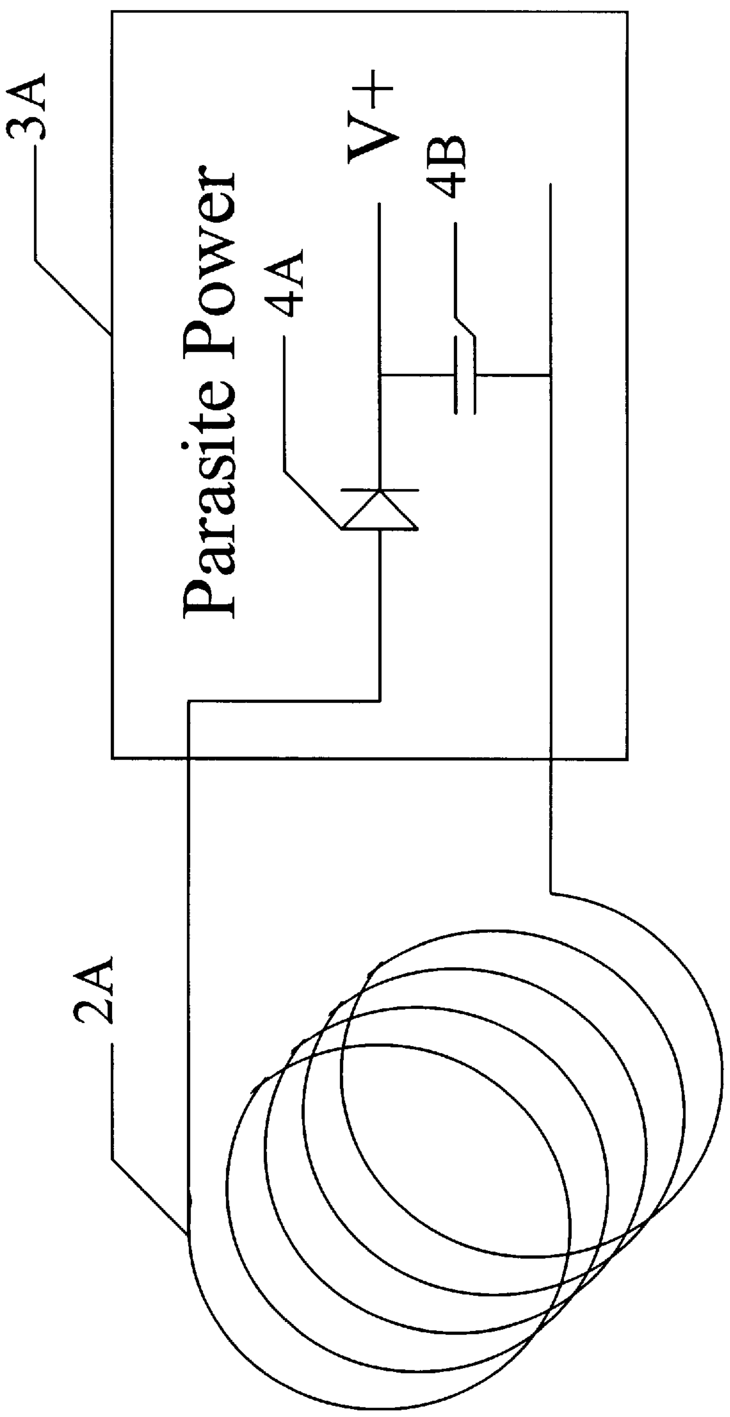
FIG. 4 illustrates a circuit to power one embodiment of a personal voting code enabled electronic ballot.

FIG. 4 illustrates one embodiment of the power parasite circuit. Coil 2A receives signals from outside of PVCe-ballot. Power parasite circuit 3A captures the energy on capacitor 4B of the electric pulses of coil 2A. Diode 4A allows electric charges to accumulate in capacitor 4B and prevents the coil from discharging the capacitor 4B.

Figure 5:
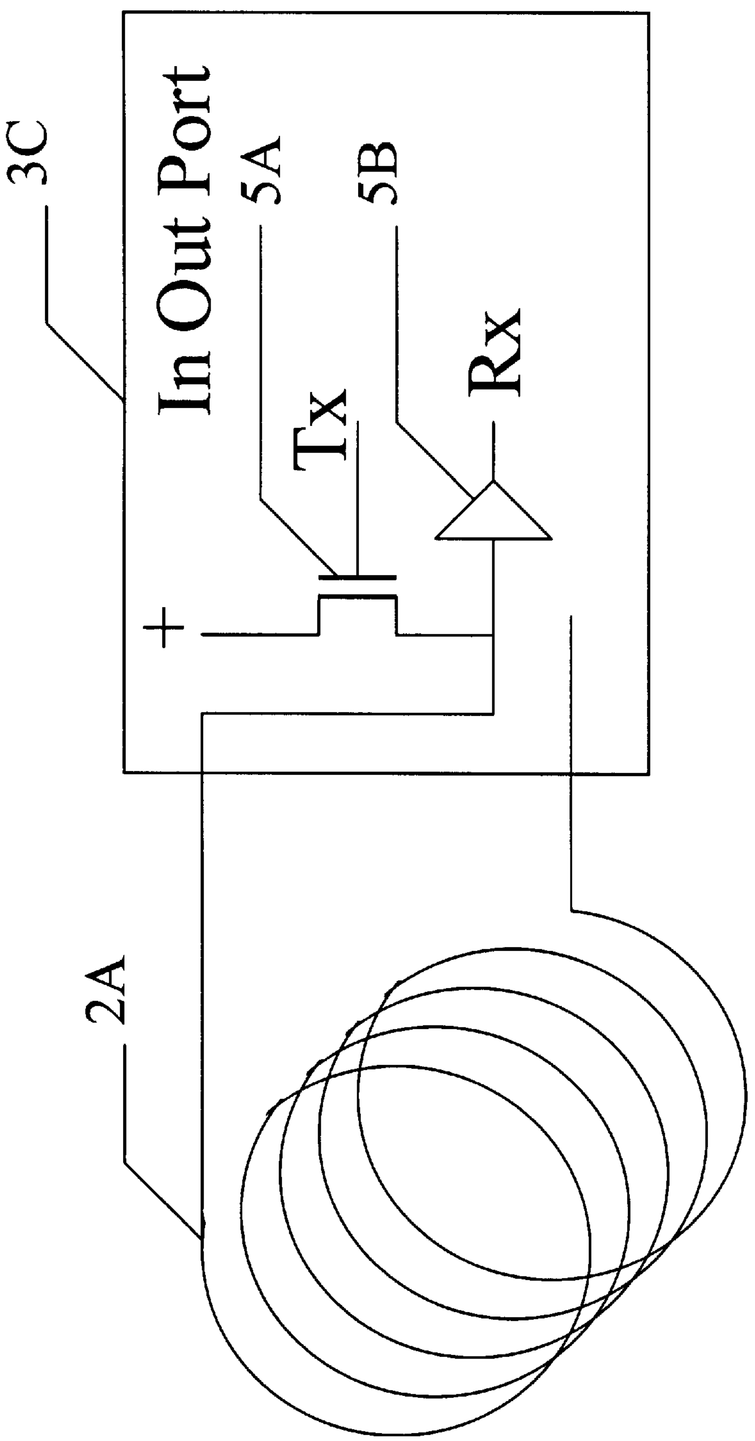
FIG. 5 illustrates a communication circuit of one embodiment of a personal voting code enabled electronic ballot.

FIG. 5 illustrates one embodiment of the functioning of the input/output port for a PVCe-ballot. Coil 2A receives a signals from the outside of an PVCe-ballot, in turn, activating the input portion of circuit 3C to generate a digital signal RX using circuit identified as SB. The output portion of circuit 3C can convert a digital signal TX using, for example, a transistor 5A and then transmitting a magnetic pulse using coil 2A.

Figure 6:
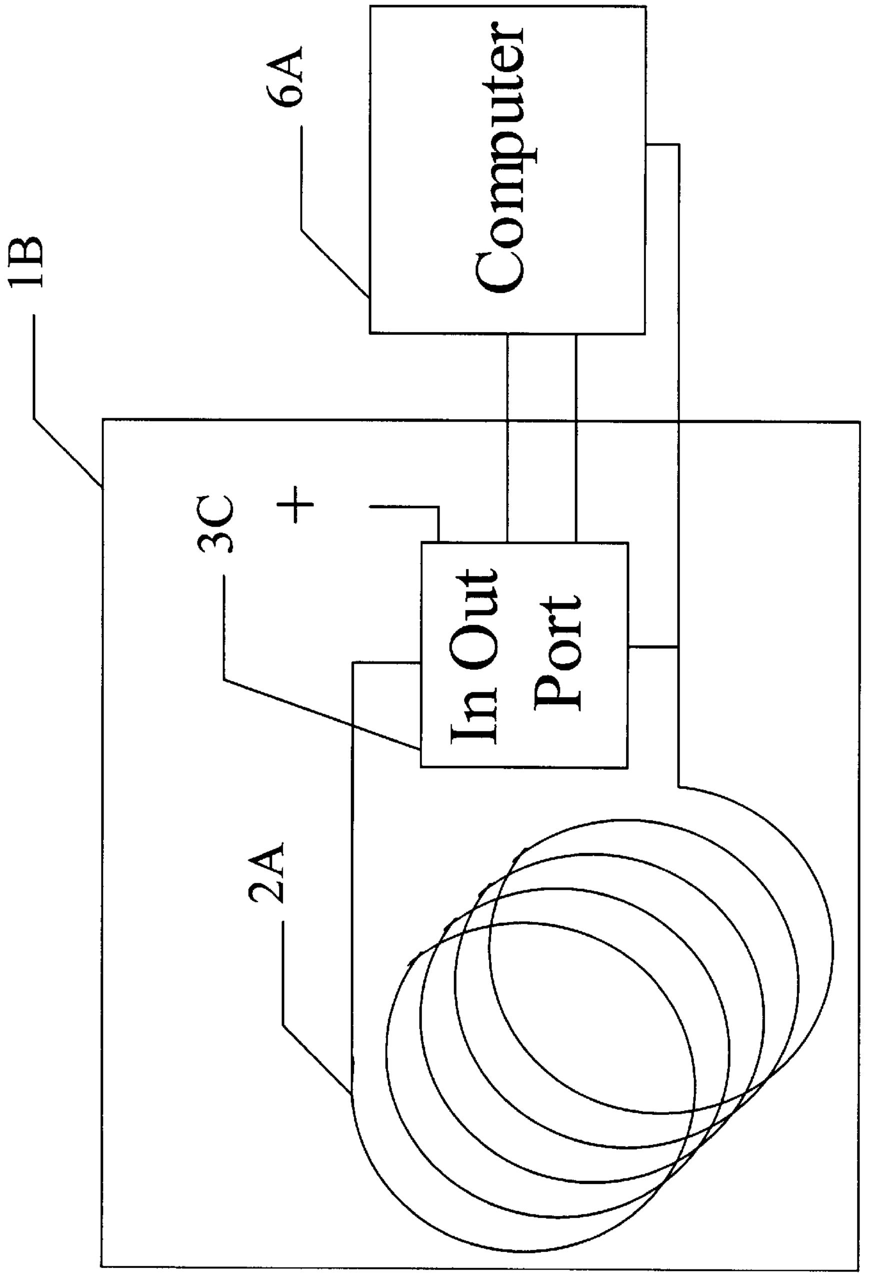
FIG. 6 illustrates a block diagram for a computer communication interface circuit for use with one embodiment of a personal voting code enabled electronic ballot.

FIG. 6 illustrates one embodiment of the internal parts of an electronic computer or personal computer interface. Interface 1B provides connectivity between a PVCe-ballot and a computer 6A. Illustrated in this embodiment are coil 2A, input/output port 3C and connections to computer 6A. Interface 1B may be external to the computer, use an expansion card slot or be fully integrated into the circuitry of computer 6A. As compared to the circuitry of the described embodiment for a PVCe-ballot, power is supplied directly from the computer power supply or other external power source thus eliminating the need for parasitic power circuit. Coil 2A functions to receive or transmit signals between the computer 6A and a PVCe-ballot. With only small changes the input/output circuits 3C of interface 1B may be the same as those of a PVCe-ballot input/output circuits.

Figure 7:
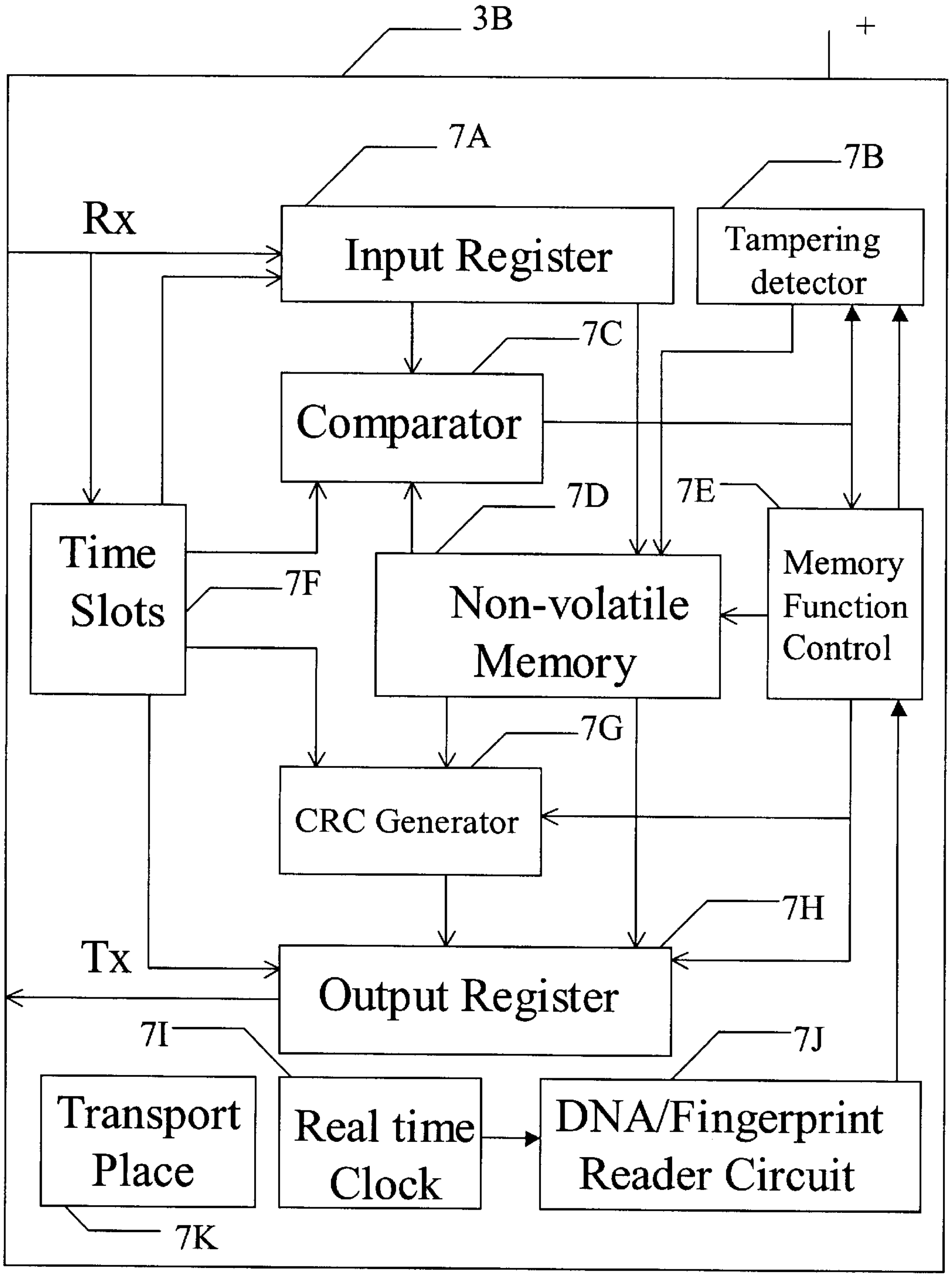
FIG. 7 illustrates a block diagram of a non-volatile memory and control circuit for one embodiment of a personal voting code enabled electronic ballot.

FIG. 7 illustrates in greater detail one embodiment of a non-volatile memory component (NVM) 3B of a PVCe-ballot. Digital serial signal Rx triggers time circuit 7F with the end of the first bit. Input register 7A loads all subsequent bits timed by the circuit 7F. After the end of the serial message time circuit 7F enables the comparator 7C to control the flow of information being stored in or retrieved from non-volatile memory 7D. Whether the information is to be saved or retrieved is determined by memory function control circuit 7E. Additionally comparator 7C is used to discard corrupted messages. Tampering detector 7B monitors for electronic or physical tampering. In the event tampering is detected, memory function controller 7E can be instructed to clear non-volatile memory 7D. In addition to storing incoming information Rx, non-volatile memory may store a time stamp from real time clock 71, biometric data from, for example, a fingerprint scanner 7J and location code or message identifying the voting officials receiving location 7K.

Time circuit 7F is also used during transmission of data Tx from non-volatile, memory storage 7D. In general, it is good practice to have transmitted data Tx comprise a means to verify the data has not been corrupted during transmission. Common methods include the use of parity or CRC check bits. For example CRC check bits can be generated with a CRC generator circuit 7G The CRC check bits are then combined with the information from non-volatile memory 7D in the output register 7H. Output register 7H serializes the message to be transmitted on output signal line Tx.

Non-volatile memory 7D is used to store voter identification, voter verification information (e.g. personal identification number (PIN) or biometric data, for example fingerprint scan), personal voting codes (PVCs), voting selections and, when used, party access codes (PACs).

Comparator 7C allows storing of voting selections only upon receipt of matching voter verification information and one or more matching PVCs. A matching PVC is treated as an affirmative voting selection. Codes received that do not exactly match a stored PVC are identified as a negative voting selection. When party access codes are used, comparator 7C prevents transmission of stored voting selections unless the PVCe-ballot first receives a proper PAC (or for enhanced security two or more proper PACs). Tampering detector circuit 7B can be used to automatically clear non-volatile memory 7D if electronic or physical tampering is detected. Similarly, comparator 7C can be used to automatically clear non-volatile memory 7D if excessive numbers of attempts at accessing the stored information is detected. For example, if five failed attempts to enter proper PACs, comparator 7C can triggered memory clearing. To further assure the identity of a voter, the PVCe-ballot may incorporate a DNA sample holder and/or a fingerprint pad, illustrated as transport place 7K.

Figure 8:
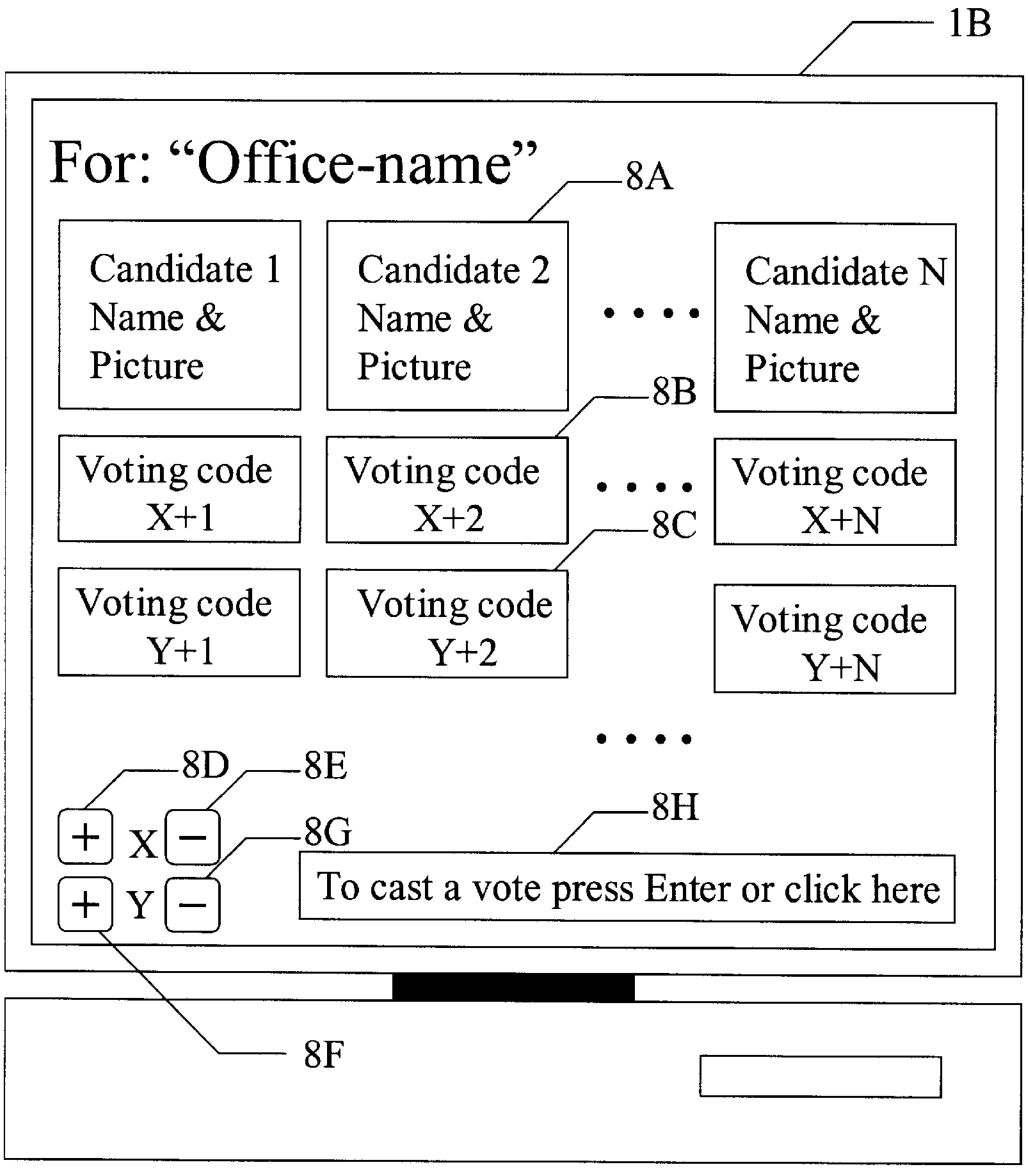
FIG. 8 illustrates an example of election data displayed to a voter on a personal computer screen that maintains vote secrecy when visible to third parties.

FIG. 8 illustrates a computer 1B screen used to input voting selections while maintaining voting selection secrecy should voter entries be observed by third parties. Various suitable computer input devices are known in the art and include, without limitation, touch screens, active stylus, keyboard, mouse and trackballs. Two examples will be described for using FIG. 8, namely use of a single personal voting code per voting selection and use of two personal voting codes per voting selection.

In the first example of FIG. 8, numbers are used for personal voting codes (PVC) and one PVC is used for each voting selection. The use of numbers for PVCs is not limiting, as random letters or words may also be used as PVCs. Computer 1B assigns an identifying number 8B and a random number 8C to each voting selection. When voting for candidates, they will normally be identified with names 8A although pictures may also be displayed. Preferably, numbers 8B start with a fixed or random number, then are incremented sequentially from left to right.

To make an entry, a voter first selects a voting target (e.g. candidate) then changes the associated number 8C. A voting target is selected by highlighting the associated number 8B. Selecting or pressing button 8D selects the voting target to the right (increment) while selecting 8E selects the next voting target to the left (decrement). Once a voting target is highlighted, the voter increases or decreases the associated voting code from the initialized random numbers 8C. A valid cast vote only occurs when a voting code matches one of the stored personal voting codes. Pressing or selecting 8F increments the starting number 8C while pressing or selection 8G decrements a starting number 8C. The voter is allowed to change as few or as many of the voting codes. Preferably two or more voting codes are changed for each voting selection. In the event that more than one candidate must be chosen for an elected office, different PVCs must be used for each candidate in order to obscure the identity of the PVCs. For convenience, personal voting codes (PVCs) may consist of a single digit or character. Once all voting code changes are complete, the voter presses or selects 8H to store the results in the non-volatile memory of the PVCe-ballot.

The computer screen of FIG. 8 is also suitable for dual personal voting code voting. In this example, the voting target is selected by pressing or otherwise selecting the voting target 8A (e.g. candidate). Two voting codes are then entered for the voting target, one at 8B and one at 8C. For an affirmative voting selection to count, both of the entered voting codes must match personal voting codes (PVCs). In using the screen of FIG. 8, pressing or selecting 8D increments the voting code in the upper row 8B and pressing or selecting 8F increments the voting code in the lower row 8C. Similarly, pressing or selecting 8E decrements the upper row voting code 8B and pressing or selecting 8G decrements the lower row voting code 8C.

Figure 9:
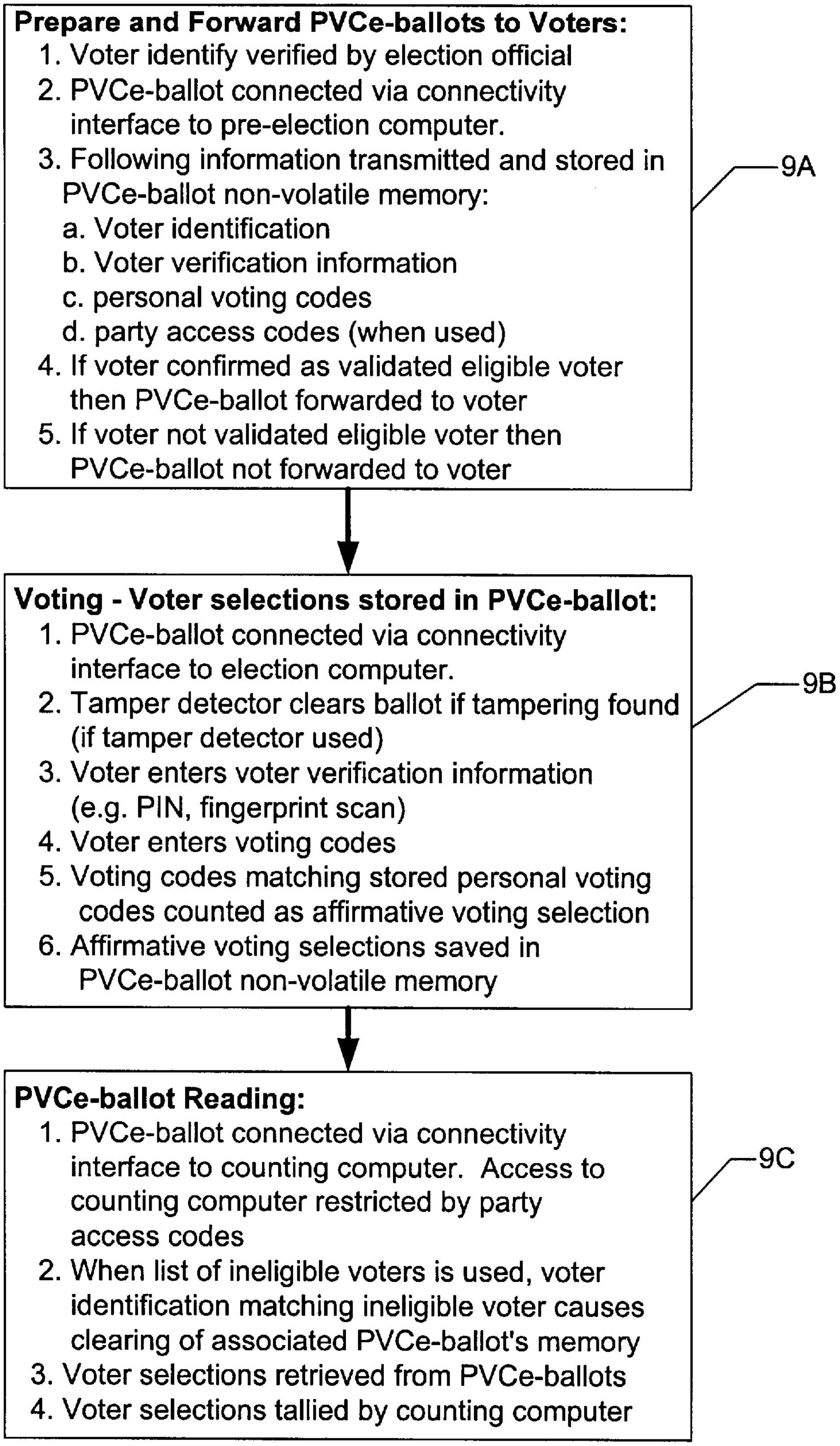
FIG. 9 illustrates a flowchart of the operation of an embodiment of the present invention.

The method of the present invention is summarized in FIG. 9. In general, the method proceeds in three phases. In pre-election phase 9A, a pre-election computer is used to prepare PVCe-ballots that are, in turn, forwarded to voters. Voting phase 9B occurs next and voting selections are stored in the non-volatile memory of PVCe-ballots. The PVCe-ballots are then returned to the election officials. The final phase 9C is to read valid votes from the PVCe-ballots, reject votes form invalid votes and tally the votes at a counting computer. As stated above, the present invention is not overly taxing for modern computer hardware and personal computers are suitable for the computers.

Pre-election phase 9A includes the steps of storing voter identification, verification information and personal voting codes in PVCe-ballots. Separately, a list of validated eligible voters is established in a pre-election computer. The pre-election computer is then used to connect to each PVCe-ballot and in the case of a validated eligible voter store voter selection information into the non-volatile memory of the PVCe-ballot (along with party access codes, if being utilized). In the alternative, PVCe-ballots of ineligible or invalidated voters have their non-volatile memory cleared thereby readying them for use by other voters.

Voting phase 9B occurs at any computer convenient to the voter. The PVCe-ballot is connected to a voting computer and the voter first enters his or her verification information (e.g. personal identification number (PIN) or biometric data). Voting proceeds by entering voting codes at designated voting targets. When voting codes match stored personal voting codes, an affirmative vote is stored. Non-matching voting codes are ignored.

Election results are obtained in PVCe-ballot reading phase 9C. Connectivity between PVCe-ballots and a counting computer is established and voter selections are transmitted to the counting computer. Transmission of voter selections as well as access to the counting computer may optionally be restricted by the use of party, access codes (PACs). Optionally, a list of invalid voters can be established. Upon connecting a PVCe-ballot from an ineligible voter to the counting computer, the PVCe-ballot can be automatically instructed to clear its non-volatile memory.

Although the invention has been shown and described with respect to exemplary embodiments, various changes may be made without departing from the spirit and scope of the invention. For example, method steps may be all performed by a single computer performing the functions of pre-election computer, voting computer and election computer. The invention is to be limited solely by the scope and equivalents of the following claims:

I claim:

1. An apparatus to cast votes from home that maintains voting confidentiality when voting is observed by third parties comprising one or more computers, a plurality of personal voting code enabled electronic ballots and one or more computer connectivity interfaces; wherein voting codes are entered by a verified voter, voting codes are stored into non-volatile memory of the personal voting code enabled electronic ballot and wherein an affirmative voting selection occurs when the stored voting code matches a personal voting code of a validated eligible voter.

2. The apparatus of claim 1 wherein the personal voting code enabled electronic ballot comprises a smart card containing non-volatile memory locations for voter identification, voter verification and a plurality of personal voting codes.

3. The apparatus of claim 1 wherein the computer connectivity interface means comprise a magnetic field.

4. The apparatus of claim 1 wherein the computer connectivity interface means comprise electric signal means.

5. The apparatus of claim 1 wherein the computer connectivity interface means comprise radio frequency signaling means.

6. The apparatus of claim 1 wherein computer connectivity interface means comprise optical signaling means.

7. The apparatus of claim 1 wherein the computer connectivity interface means comprise audible signaling means.

8. The apparatus of claim 1 wherein the non-volatile memory comprises electrically erasable programmable read only memory (EEPROM).

9. The apparatus of claim 1 wherein power is supplied to the personal voting codes enabled electronic ballot by a battery.

10. The apparatus of claim 1 wherein power is supplied to the personal voting codes enabled electronic ballot by a magnetic field.

11. The apparatus of claim 1 wherein voter verification comprises matching entered biometric data to biometric data stored in the non-volatile memory of the personal voting code enabled electronic ballot.

12. The apparatus of claim 1 wherein the non-volatile memory includes location for storing the date upon which voting codes are entered.

13. The apparatus of claim 1 wherein the personal voting code enabled electronic ballot further comprises a real time clock.

14. The apparatus of claim 1 wherein the personal voting code enabled electronic ballot further comprises a circuit to detect tampering attacks wherein the circuit to detect tampering attacks may initiate clearing of the non-volatile memory upon detection of tampering.

15. The apparatus of claim 1 further comprising fingerprint scanner means.

16. The apparatus of claim 1 wherein the apparatus further comprise means to read a DNA sample.

17. The apparatus of claim 1 wherein the personal voting code enabled electronic ballot further comprises means to transport a DNA sample.

18. The apparatus of claim 1 wherein the personal voting code enabled electronic ballot further comprises means to transport a fingerprint.

19. A method of casting a vote on elections using a personal voting code enabled electronic ballot such that voting, confidentiality is maintained when voting is observed by third parties comprising the steps of:

preparing a personal voting code enabled electronic ballot for election under the supervision of election officials;

entering voter verification information that matches information stored in the personal voting code enabled electronic ballot; and identifying affirmative voting selections by entering voting codes that match personal voting codes stored in the personal voting code enabled electronic ballot.

20. A computer connectivity interface that utilizes magnetic fields to communicate data between a computer and a personal voting code enabled electronic ballot.

* * * * *